United States Patent [19]

Yang

[11] Patent Number: 5,254,913
[45] Date of Patent: Oct. 19, 1993

[54] SPEED LIMITING CIRCUIT FOR UNIVERSAL TYPE SERIES OR COMPOUND ELECTRIC MOTOR

[76] Inventor: Tai-Her Yang, 5-1 Taipin St., Si-Hu Town, Dzan-Hwa, Taiwan

[21] Appl. No.: 745,006

[22] Filed: Aug. 14, 1991

[51] Int. Cl.⁵ .............................................. H02K 23/00
[52] U.S. Cl. .................................... 318/251; 318/250; 388/905; 361/33; 361/54
[58] Field of Search ............... 318/701, 254, 138, 782, 318/696, 250, 251; 388/905; 361/33, 53, 54, 56

[56] References Cited

U.S. PATENT DOCUMENTS

| | | | |
|---|---|---|---|
| 3,187,246 | 6/1965 | Garten | 318/250 |
| 3,221,234 | 11/1965 | Ault | 318/250 |
| 3,590,352 | 6/1971 | Ries | 318/251 |
| 4,086,983 | 5/1978 | Anzai et al. | 318/250 |
| 4,131,832 | 12/1978 | Cavil et al. | 318/251 |
| 4,213,077 | 7/1980 | Hornung et al. | 318/250 |
| 5,015,928 | 5/1991 | Yang | 318/251 |

Primary Examiner—William M. Shoop, Jr.
Assistant Examiner—John W. Cabeca
Attorney, Agent, or Firm—Leonard Bloom

[57] ABSTRACT

A device for limiting the maximum and/or minimum speed of universal series- or compound-type electric motors. The device includes a first impedance element for limiting the maximum speed of the motor under light load (high speed) conditions to a predetermined value, and a second impedance element for limiting the minimum speed of the motor under high load (low speed) conditions. The limited maximum and minimum speeds of the motor give it operating characteristics which are similar to a shunt motor. Various impedance elements are provided to accommodate

4 Claims, 2 Drawing Sheets

SPEED LIMITING CIRCUIT FOR UNIVERSAL TYPE SERIES OR COMPOUND ELECTRIC MOTOR

BACKGROUND OF THE INVENTION

1. Field of the Invention

The present invention relates to universal series-excitation and compound excitation electric motors and, more particularly, to a speed limiting circuit for controlling the speed of such motors under load and no load condition.

2. Description of the Background

Conventional universal series or compound electric motors are widely utilized in driving various kinds of industrial machinery, electric tools, and household appliances. However, these types of motors have an undesirable characteristic in that they are very load sensitive.

Series motors develop a high torque at starting and run at a speed which is dependent on load. As the load on the motor is decreased, the speed of the motor will increase. The load dependency of series and compound motors is due to the method in which the field and armature windings are connected. In the series motor, the field and armature windings are connected in series so that the strength of the field is dependent on the motor load and varies with armature current. The load dependency is a desirable characteristic in many applications, including industrial machinery which must initially accelerate at high torque to a higher continuous speed and lower operating torque. However, under no load conditions, the high rotational speed causes noise and wear on the gear and bearings of the transmission device. Under high load conditions, the rotational speed slows, the field winding becomes saturated, and efficiency is decreased.

The speed/load dependency is reduced in conventional shunt motors where the field winding is connected in parallel with the armature. This way, the field winding is energized by a constant voltage so that the magnetic field remains constant. Consequently, the speed remains relatively constant under varying load conditions. However, shunt motors lack the inherent high starting torque of series-excitation motors.

A compound motor is a hybrid of the above-described series and shunt motors. In addition to the shunt field winding in parallel with the armature, the compound motor has a series winding which reinforces the field. Compound motors have a high starting torque similar to series motors and exhibit some degree of speed constancy as in the shunt motor. Nevertheless, the variance in speed of compound motors can have detrimental effects similar to those of series motors, such as wear on the transmission device and high speed noise.

Hence, there exists a clear commercial need for a device capable of limiting the maximum and/or minimum speed of series motors, and of maintaining tighter control of the maximum and/or minimum speed of compound motors.

SUMMARY OF THE INVENTION

Accordingly, it is an object of the present invention to provide a circuit for limiting the speed of a universal type series or compound electric motor under load and no load conditions.

It is another object of this invention to provide a circuit which allows a selection between high or low speed limiting functions, or simultaneous high and low speed limiting functions.

It is a further object of the present invention to provide for the adjustment of the maximum and minimum motor speeds by selection of the limiting voltage values.

It is still another object of the invention to provide a plurality of circuit embodiments for accommodating various types of power supplies.

The present invention accomplishes the above-described and other objects in series and compound motors by a limiter shunt device which is mounted in parallel with either of the field winding, the armature, or both.

The limiter shunt device is coupled in parallel across either one of the field or armature winding of the motor. Alternatively, two limiter shunt devices may each be connected across the respective windings. The shunt devices are triggered when a voltage in the respective winding exceeds a predetermined value to shunt current around the winding.

In the case of a low speed limiter shunt device across the field winding, the triggered shunt device will shunt current to the armature thereby maintaining a fused field intensity and a minimum speed. Consequently, the armature takes on the operational characteristics of a parallel excitation electric motor. Likewise, a high speed limited shunt device across the armature winding draws current through the field winding under low load conditions thereby limiting the maximum speed of the motor. This limiting of the speed avoids high speed noise and protects the transmission device.

The limiter shunt device may be embodied in a plurality of different circuit schematics to accommodate the various power supply types.

The impedance of the limiter shunt device is also selectable to meet power supply regiments. A series inductive, capacitive, resistive, or mixed type impedance element may be selected. In addition, a series auxiliary field winding with identical polarity to the motor field winding may be selected in order to increase the field when the limiter shunt device is triggered.

BRIEF DESCRIPTION OF THE DRAWINGS

Other objects, features, and advantages of the present invention will become more apparent from the following description of the invention with reference to the enclosed drawings, in which.

DETAILED DESCRIPTION OF THE PREFERRED EMBODIMENTS

Figure 1:
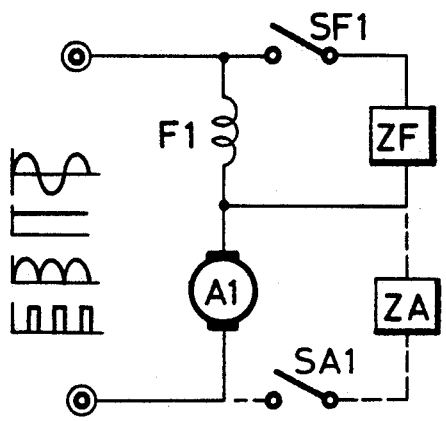
FIG. 1 is a block diagram showing a high/low limiting speed circuit according to the present invention incorporated in a universal type series excitation motor.

FIG. 1 is a schematic showing a high/low speed limiting circuit for universal series electric motors, wherein the motor may be driven by an AC (sine or $sine^2$), DC, or pulsed-DC power supply.

As shown, the field coil F1 and the armature A1 are wired in series in such a motor. The power supply is connected in parallel across the series-connected field coil F1 and armature coil A1.

A limiter shunt device ZF may be selectively connected across the field coil F1 via a switch SF1. SF1 is a conventional switch or relay which provides a convenient way of removing limiter shunt device ZF from the circuit. When limiter shunt device ZF is connected via switch SF1, the limiter shunt device ZF operates in accordance with the voltage applied to it. Specifically, when the voltage of the field coil F1 increases above a predetermined limiting value due to heavy load conditions, the limiter shunt device ZF acts to shunt current through circuit ZF to the armature, A1. This action creates a minimum speed below which the slowing motor speed cannot fall.

Likewise, a limiter shunt device ZA may be connected across the armature coil A1 via switch SA1. This way, when the voltage of the armature coil A1 increases above a predetermined limiting value due to no load conditions, the limiter shunt device ZA is switched into the circuit by switch SA1 and shunt current flows through circuit ZA. This action creates a maximum speed above which the accelerating motor speed cannot pass.

Since switch SF1 allows selective application/removal of the low speed limiting function of the field coil limiter shunt device ZF, and switch SA1 allows selective application/removal of the high speed limiting function of the armature limiter shunt device ZA, independent application/removal of the low, high, or both low and high speed limiting functions may be carried out.

Figure 2:
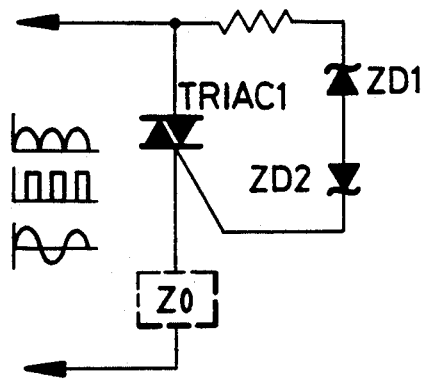
FIG. 2 is a detailed schematic of one embodiment of a limiter shunt device circuit employing a silicon controlled rectifier (thyristor) which is suited for us as device ZF and/or ZA as shown in the circuit of FIG. 1 when powered by an AC or pulsed-DC input.

FIG. 2 is a circuit schematic of the limiter shunt device circuit employing AC silicon controlled rectifier TRIAC1 (thyristor) having a gate connected to a bi-lateral zener diodes ZD1 and ZD2, which diodes are in turn connected to a resistance. The circuit of FIG. 2 is suited for use as ZF or ZA of FIG. 1 when an AC (sine or $sine^2$) or pulsed-DC power supply input is applied.

In operation, when the field coil F1 voltage or armature coil A1 voltage is less than the predetermined zener voltage values VZD1 or VZD2 of Zener diodes ZD1 and ZD2, respectively, then TRIAC1 remains in a non-conducting blocking state and there is no current shunting action. However, once the field coil F1 voltage or armature coil A1 voltage rises above voltage limits VZD1 and VZD2, TRIAC1 is triggered and current is shunted. This maintains the speed of the motor.

A current limiter Zo ma be provided in series with the TRIAC1. The current limiter Zo may be a resistive, capacitive, inductive, or mixed type impedance element that will limit the rate of current shunting.

In addition, an auxiliary field winding (not shown) having identical polarity to the motor field winding F1 may be provided in place of current limiter Zo. The auxiliary field winding will increase the magnetic field when current shunting is occurring.

Figure 3:
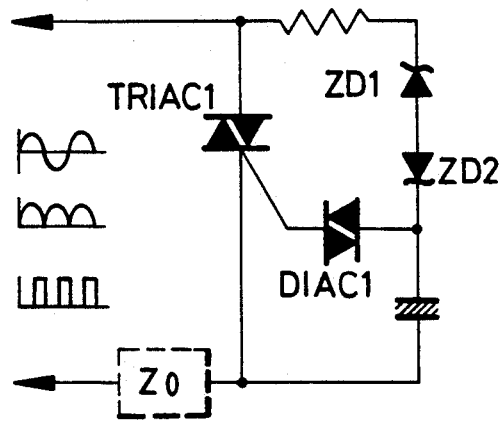
FIG. 3 is a detailed schematic of another embodiment of a limiter shunt device circuit employing silicon controlled rectifiers (thyristors), this embodiment likewise being suited for use as device ZF and/or ZA as shown in the circuit of FIG. 1 when powered by an AC or pulsed-DC input.

FIG. 3 is a circuit schematic of an alternative limiter shunt device circuit employing AC silicon controlled rectifiers TRIAC1 and DIAC1 (thyristors). The gate of TRIAC1 is connected as shown through DIAC1 to bi-lateral zener diodes ZD1 and ZD2, which diodes are in turn connected to a resistance. Like the circuit in FIG. 2, the limiter shunt device circuit of FIG. 3 will accommodate either AC (sine or sin ) or pulsed-DC power supply inputs. In operation, TRIAC1 will trigger once the Zener voltage thresholds, VZD1 and VZD2, are surpassed, and current will be shunted.

Figure 4:
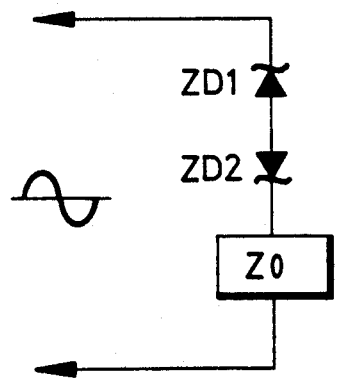
FIG 4 is an embodiment of a low power limiter shunt device circuit employing Zener diodes, this embodiment being suited for use as device ZF and/or ZA as shown in the circuit of FIG. 1 when powered by an AC input.

FIG. 4 is a circuit schematic of an alternative low-power embodiment of a limiter shunt device circuit employing bilateral Zener diodes ZD1 and ZD2, and series-connected shunt resistance Zo, for accommodating only AC power supply inputs.

Figure 5:
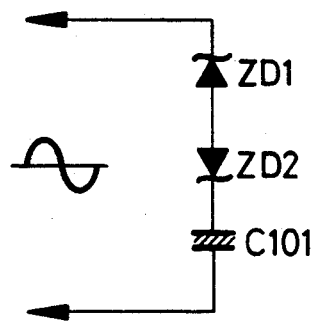
FIG. 5 is an alternative embodiment of a limiter shunt device circuit employing Zener diodes with a series-capacitance, this embodiment likewise being suited for use as device ZF and/or ZA as shown in the circuit of FIG. 1 when powered by an AC input.

FIG. 5 is a circuit schematic of an alternative low power limiter shunt device which employs bilateral Zener diodes ZD1 and ZD2, and series-connected shunt capacitance C101, for accommodating only AC power supply inputs.

Figure 6:
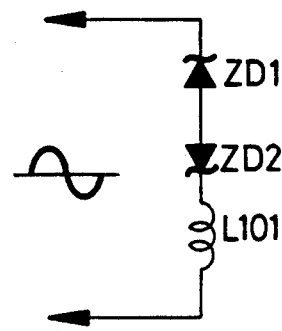
FIG. 6 is an alternative embodiment of a limiter shunt device circuit employing Zener diodes with a series-inductance, this embodiment likewise being suited for use as device ZF and/or ZA as shown in the circuit of FIG. 1 when powered by an AC input.

FIG. 6 is a circuit schematic of another alternative low power limiter shunt device which employs bilateral Zener diodes ZD1 and ZD2, and series-connected shunt inductance L101, for accommodating only AC power supply inputs.

FIGS. 7–10 teach the effect of the limiter shunt devices embodied in FIGS. 2–6, mounted in parallel with the field coil F1 and/or armature coil A1 as in FIG. 1.

Figure 7:
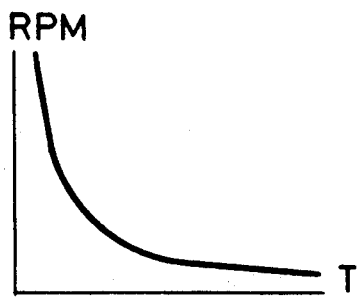
FIG. 7 is a graph showing the operation of a conventional series excitation motor in terms of RPM (speed) v. TORQUE (LOAD)

FIG. 7 is a RPM v. TORQUE (LOAD) graph showing the operational characteristics of a conventional series electric motor. Note that the speed rises indefinitely as the load is decreased and the speed decreases indefentely as the load is increased.

Figure 8:
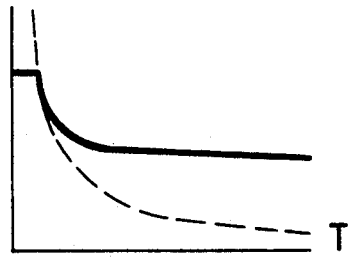
FIG. 8 is a graph of RPM (speed) v. TORQUE (LOAD) showing the operational characteristics of a series excitation motor having limiter shunt device circuits ZF and ZA according to the present invention mounted in parallel with both the field and armature windings as shown in FIG. 1.

FIG. 8 is a RPM v. TORQUE graph showing the operational characteristics of a series electric motor having limiter shunt devices ZF and ZA mounted in parallel with the field coil F1 and armature coil A1, respectively, as shown in FIG. 1. The operational characteristics of a conventional series electric motor are superposed (see dotted line) for contrast. The armature appears to operate like a shunt electric motor. Note that the motor's top speed is limited under light load conditions and the motor's slowest speed is limited under heavy load conditions thereby protecting the transmission device and reducing noise level under light load conditions and increasing efficiency under heavy load conditions. The high and low limiting speed values may be preset by adjusting the Zener diode threshold voltages of the limiter shunt device circuits.

Figure 9:
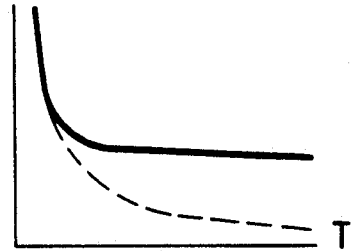
FIG. 9 is a graph of RPM (speed) v. TORQUE (LOAD) showing the operational characteristics of a series excitation motor having a limiter shunt device circuit ZF according to the present invention mounted in parallel with the field winding only.

FIG. 9 is an RPM v. TORQUE graph showing the operational characteristics of a series excitation motor with a limiter shunt device ZF mounted in parallel with the field coil F1 for effecting only the low-speed limiting function. The operational characteristics of a conventional series electric motor are superposed (see dotted line) for contrast. Note that the motor's top speed is not limited. Hence, current is shunted to the armature coil A1 through the limiter shunt device ZF only under heavy load and starting conditions when the speed of the motor decreases below the threshold speed as determined by the Zener diode ZD1 and ZD2 threshold voltages VZD1 and VZD2.

Figure 10:
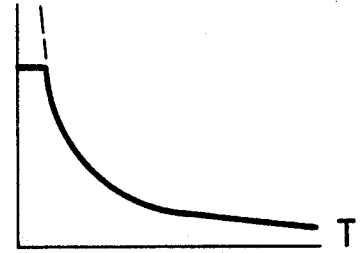
FIG 10 is a graph of RPM (speed) v. TORQUE (LOAD) showing the operational characteristics of a series excitation motor having a limiter shunt device circuit ZA according to the present invention mounted in parallel with the armature winding only.

FIG. 10 is an RPM v. TORQUE graph showing the operational characteristics of a series excitation motor with a limiter shunt device ZA mounted in parallel with the armature coil A1 for effecting only the high-speed limiting function. Note that the motor's lowest speed is not limited. Hence, when the load gets lighter and the armature's negative electromotive force (EMF) rises, some of the field coil F1 current will flow through the limiter shunt device ZA, thereby maintaining field magnetization to limit the top speed. The threshold at which current is shunted around the armature coil A1 through the limiter shunt device ZA is likewise determined by the Zener diode ZD1 and ZD2 threshold voltages VZD1 and VZD2.

Figure 11:
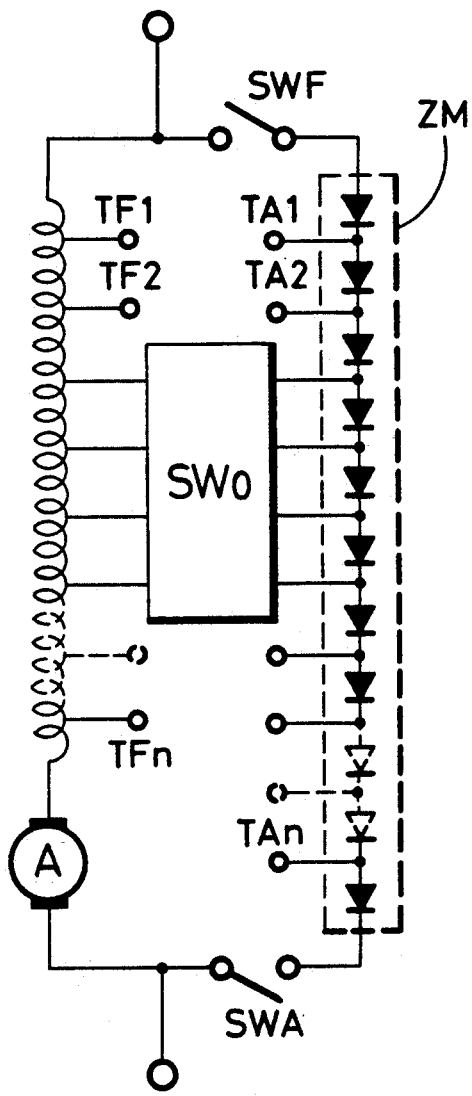
FIG 11 is a diagram showing a line of shunt devices with block-type adjustable limiting voltage value.

FIG. 11 is a circuit diagram of a variable (adjustable) type limiter shunt device circuit which enables easy modification of the preset voltage threshold value. This adjustable limiter shunt device comprises a field winding TF with a plurality of taps TF1-TFn. In addition, a discrete or integrated circuit series-chain of diodes ZM is tapped at each diode junction by a plurality of series taps TA1-TAn. An operating switch SWF connects one end of IC ZM to the field winding TF and to one terminal of the power supply, and an operating switch SWA connects the other end of IC ZM to the armature winding A and to the other terminal of the power supply. An operating switch SWO is connected between corresponding pairs of taps TF1-TFn and TA1-TAn for selectively connecting one of taps TF1-TFn with one of taps TA1-TAn to obtain the desired high and low speed limiting values. As before, switch SWF will trigger the low-speed limiting operation of the limiter shunt device by placing a selected number of diodes of IC ZM in parallel with the field winding TF. Likewise, switch SWA will trigger the high-speed limiting operation of the limiter shunt device by placing a selected number of diodes of IC ZM in parallel with the armature winding A.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A high/low speed limiting circuit for series excitation and compound excitation motors, comprising:

a low speed limiter shunt device coupled in parallel across a field winding of one of said motors, said shunt device being triggered when a voltage across said field winding exceeds a predetermined first value to shunt current around said field winding to an armature winding of said motor; and a high speed limiter shunt device coupled in parallel across an armature winding of one of said motors, said shunt device being triggered when a voltage across said armature winding exceeds a predetermined second value to shunt current around said armature winding of said motor;

whereby when a load applied to said motor causes said field winding voltage to exceed said predetermined first value, said low speed limiter shunt device reduces field current to limit a minimum speed of said motor, and when a substantially no-load condition on said motor causes said armature winding voltage to exceed said predetermined second value, said high speed limiter shunt device maintains field magnetization to limit a maximum speed of said motor.

2. The high/low speed limiting circuit for series excitation and compound excitation motors according to claim 1, further comprising a first switch connected in series with said low speed limiter circuit for selectively connecting said low speed limiter circuit in parallel across said motor field winding, and a second switch connected in series with said high speed limiter circuit for selectively connecting said high speed limiter circuit in parallel across said motor armature winding.

3. An adjustable high/low speed limiting circuit for a series excitation motor, comprising:

a plurality of series-connected zener diodes coupled in parallel across a series-connected field winding and armature of said motor, said diodes having a first plurality of tap leads coupled therebetween;

a second plurality of tap leads connected at successive intervals along said field winding of said motor; and a switch device for selectively connecting each first tap leads with a corresponding second tap lead, said switch device being triggered when a voltage across said field winding exceeds a predetermined first value to shunt current around said field winding to an armature winding of said motor, and said switch device being triggered when a voltage across said armature winding exceeds a predetermined second value to shunt current around said armature winding of said motor;

whereby when a load applied to said motor causes said field winding voltage to exceed said predetermined first value, said switch device reduces field current to limit a minimum speed of said motor, and when a substantially no-load condition on said motor causes said armature winding voltage to exceed said predetermined second value, said switch device maintains field magnetization to limit a maximum speed of said motor.

4. The adjustable high/low speed limiting circuit for series excitation and compound excitation motors according to claim 3, further comprising switch means connected in series between said plurality of zener diodes and said field and armature windings of said motor for selectively connecting said diodes in parallel across said motor windings.

* * * * *